US012662103B2

(12) United States Patent
Lee

(10) Patent No.: US 12,662,103 B2
(45) Date of Patent: Jun. 23, 2026

(54) ELECTRONIC PARKING BRAKE SYSTEM AND CONTROL METHOD THEREOF

(71) Applicant: HL MANDO CORPORATION, Pyeongtaek-si (KR)

(72) Inventor: Kyounghui Lee, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/898,221

(22) Filed: Sep. 26, 2024

(65) Prior Publication Data

US 2025/0313186 A1      Oct. 9, 2025

(30) Foreign Application Priority Data

Apr. 5, 2024     (KR) ........................ 10-2024-0046983

(51) Int. Cl.
*B60T 17/22*          (2006.01)
*B60T 13/74*          (2006.01)
*H02P 3/04*           (2006.01)

(52) U.S. Cl.
CPC .......... *B60T 17/221* (2013.01); *B60T 13/746* (2013.01); *H02P 3/04* (2013.01)

(58) Field of Classification Search
CPC .... B60T 17/221; B60T 13/746; B60T 13/741; B60T 17/22; H02P 3/04
See application file for complete search history.

(56) References Cited

U.S. PATENT DOCUMENTS

2017/0355356 A1 * 12/2017 Okada ........................ B60T 7/06
2023/0043134 A1 * 2/2023 Seto ........................ F16D 65/18
(Continued)

FOREIGN PATENT DOCUMENTS

DE    102011078900 A1 * 1/2013 .............. B60T 7/107
JP          4659874 B2      3/2011
(Continued)

OTHER PUBLICATIONS

Machine Translation of WO 2019026893 A1 PDF File Name: "WO2019026893A1_Machine_Translation.pdf" (Year: 2019).*
Machine Translation of WO2014013972A1 PDF File Name: "WO2014013972A1_Machine_Translation.pdf" (Year: 2014).*
Machine Translation of DE 102011078900 A1 PDF File Name: "DE102011078900A1_Machine_Translation.pdf" (Year: 2013).*

*Primary Examiner* — Grant Moubry
*Assistant Examiner* — Ruben Picon-Feliciano
(74) *Attorney, Agent, or Firm* — Seed Intellectual Property Law Group LLP

(57)                    ABSTRACT

The present disclosure relates to an electronic parking brake system and a control method thereof. The electronic parking brake system includes an electronic parking brake that includes an electronic parking brake actuator applied by a motor. The electronic parking brake system includes a current sensor configured to detect a current flowing in the motor. The electronic parking brake system includes a processor configured to control a parking apply operation of the electronic parking brake. The electronic parking brake system includes a memory configured to store an inrush current generated during the parking apply operation of the electronic parking brake in a no-load condition. The processor calculates an inrush current model based on the inrush current and may accurately estimate and remove the inrush current generated during the parking apply operation by modeling the inrush current when there is no external load.

12 Claims, 6 Drawing Sheets

(56)　　　　　　　References Cited

U.S. PATENT DOCUMENTS

2023/0066292 A1 *　3/2023　Shin ........................ B60T 8/171
2023/0075904 A1 *　3/2023　Yun ........................ B60T 17/221
2024/0166178 A1 *　5/2024　Kikawa ................ B60T 13/588

FOREIGN PATENT DOCUMENTS

JP　　　　　　4768665　B2　　9/2011
JP　　　　　2014019235　A　　2/2014
WO　　WO-2014013972　A1　*　1/2014　............. F16D 65/18
WO　　WO-2019026893　A1　*　2/2019　............. B60T 13/74

* cited by examiner

ELECTRONIC PARKING BRAKE SYSTEM AND CONTROL METHOD THEREOF

CROSS-REFERENCE TO RELATED APPLICATIONS

This application claims the priority of Korean Patent Application No. 10-2024-0046983 filed on Apr. 5, 2024, in the Korean Intellectual Property Office, the disclosure of which is incorporated herein by reference.

BACKGROUND

Technical Field

The present disclosure relates to an electronic parking brake system capable of more accurately estimating an inrush current generated when driving a motor, and a control method thereof.

Description of the Related Art

An electronic parking brake (EPB) is a system that replaces the existing mechanical parking brake with an electronic control method. The EPB provides drivers with a more convenient and stable usage experience by electronically controlling the apply and release of a parking brake, and thus, has been widely applied.

There are two types of electronic parking brakes: cable puller type and caliper type. Among these, the caliper type is a motor on caliper (MoC) type in which a motor is provided in the caliper, and allows a brake pad to be in close contact with a disc or spaced apart from the disc by the driving of the motor.

Generally, a DC motor is applied to a caliper-type electronic parking brake. When a driver actually applies the parking brake, an instantaneous inrush current is generated in the motor. This is because the motor requires torque and internal storage to overcome inertia while the motor changes from a stationary state to a moving state. Therefore, it is difficult to calculate a torque value using a current while the inrush current occurs. In particular, parking brake control (PBC) SW has no other means for receiving a state of a motor other than current and voltage, so the inrush current makes it difficult to check not only the torque value of the motor but also the state of the motor.

The PBC SW identifies a clamping force of the EPB based on the current, and an inrush current flowing several times higher than the normal state may be mistaken that the clamping force of the EPB is higher than the actual clamping force. Therefore, there is a problem of identifying that parking has been successfully completed even though the clamping force of the EPB is insufficient, or misdiagnosing a normal actuator as malfunctioning.

BRIEF SUMMARY

Various embodiments of the present disclosure provide an electronic parking brake system capable of accurately estimating and removing an inrush current generated during a parking apply operation by modeling the inrush current when there is no external load, and a control method thereof.

An electronic parking brake system according to an exemplary embodiment of the present disclosure includes: an electronic parking brake that includes an electronic parking brake (EPB) actuator applied by a motor; a current sensor configured to detect a current flowing in the motor; a processor configured to control the parking apply operation of the electronic parking brake; and a memory configured to store an inrush current generated during the parking apply operation of the electronic parking brake in a no-load condition, in which the processor may calculate an inrush current model based on the inrush current.

The processor may store the inrush current in the memory while the parking apply operation and a parking release operation of the electronic parking brake are each repeated a preset number of times.

The processor may calculate the inrush current model based on an average value of the inrush current.

The inrush current model may be an Nth order function (N is a natural number), and the processor may store coefficients of the Nth order function in the memory.

The processor may estimate a driving current of the motor by removing the inrush current generated during the parking apply operation or parking release operation of the electronic parking brake from the Nth order function.

The processor may store the inrush current in the memory as a first inrush current while the parking apply operation of the electronic parking brake is repeated a preset number of times.

The processor may store the inrush current in the memory as a second inrush current while the parking release operation of the electronic parking brake is repeated a preset number of times.

The inrush current model may include a first inrush current model and a second inrush current model, and the processor may calculate the first inrush current model based on an average value of the first inrush current, and calculate the second inrush current model based on an average value of the second inrush current.

The first inrush current model and the second inrush current model may be the Nth order function (N is a natural number), and the processor may store each coefficient of each Nth order function in the memory.

The processor may identify a clamping force of the EPB actuator based on the estimated driving current.

A control method of an electronic parking brake system to another exemplary embodiment of the present disclosure including an electronic parking brake (EPB) actuator applied by a motor includes: identifying a no-load condition; in the no-load condition, storing an inrush current generated in a parking apply operation by applying the electronic parking brake a preset number of times; and calculating an inrush current model based on the inrush current.

The storing of the inrush current may include storing the inrush current while the parking apply operation and a parking release operation of the electronic parking brake are each repeated a preset number of times.

The calculating of the inrush current model may include calculating the inrush current model based on an average value of the inrush current.

The inrush current model may be an Nth order function (N is a natural number), and the calculating of the inrush current model may include storing coefficients of the Nth order function.

The storing of the inrush current may include storing the inrush current as a first inrush current while the parking apply operation of the electronic parking brake is repeated a preset number of times.

The storing of the inrush current may include storing the inrush current as a second inrush current while the parking release operation of the electronic parking brake is repeated a preset number of times.

The inrush current model may include a first inrush current model and a second inrush current model, and the calculating of the inrush current model may include calculating of the first inrush current model based on the average value of the first inrush current, and calculating the second inrush current model based on the average value of the second inrush current.

The first inrush current model and the second inrush current model may be the Nth order function (N is a natural number), and the calculating of the inrush current model may include storing each coefficient of the Nth order function.

The control method of an electronic parking brake system may further include: estimating a driving current of the motor by removing the inrush current generated during the parking apply operation or parking release operation of the electronic parking brake from the Nth order function, and identifying a clamping force of the EPB actuator based on the estimated driving current.

A control method of an electronic parking brake system according to still another exemplary embodiment of the present disclosure including an electronic parking brake (EPB) actuator applied by a motor includes: identifying a no-load condition; in the no-load condition, storing an inrush current generated during a parking apply operation of the electronic parking brake a preset number of times; storing the inrush current generated when the parking of the electronic parking brake is released the preset number of times; calculating an average value of the stored inrush current; calculating an inrush current model based on the average value of the inrush current; and identifying a clamping force of the EPB actuator during the parking apply operation of the electronic parking brake in the no-load condition based on the inrush current model and the inrush current.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
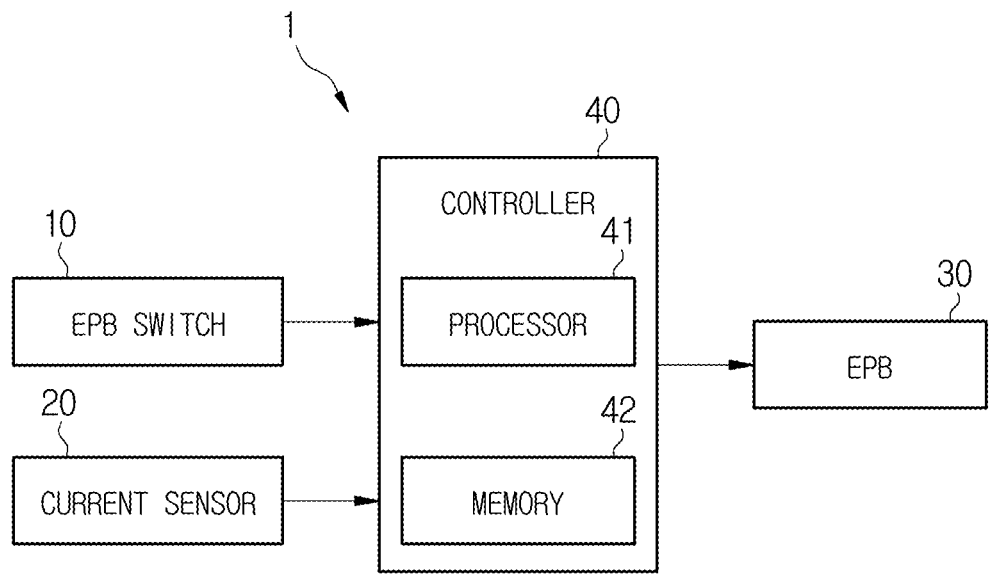
FIG. 1 is a diagram illustrating an electronic parking brake system included in a vehicle according to one exemplary embodiment.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Throughout the specification, the same reference numerals denote the same components. The present specification does not describe all elements of exemplary embodiments, and general content in the technical field to which the present disclosure pertains or content that overlaps between exemplary embodiments will be omitted. The terms "unit, module, member, block" used in the specification may be implemented in software or hardware, and according to exemplary embodiments, a plurality of "units, modules, members, blocks" may be implemented as one component, or one "unit, module, member, block" can also include a plurality of components.

Throughout the specification, "connecting" any part to another part includes not only direct connection but also indirect connection, and the indirect connection includes connection through a wireless communication network.

The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

In addition, unless explicitly described to the contrary, "including" any component will be understood to imply the inclusion of other components rather than the exclusion of other components.

Throughout the specification, when any member is referred to as being positioned "on" another member, it includes not only a case in which any member and another member are in contact with each other, but also a case in which the other member is interposed between any member and another member.

The terms "first," "second," and the like are used to distinguish one element from another element, and the elements are not defined by the above-described terms.

Singular forms are intended to include plural forms unless the context clearly makes an exception.

In each step, an identification symbol is used for convenience of description, and the identification symbol does not describe the order of each step, and each step may be performed differently from the specified order unless the specific order is clearly stated in the context.

Hereinafter, operating principles and exemplary embodiments of the present disclosure will be described with reference to the attached drawings.

Figure 2:
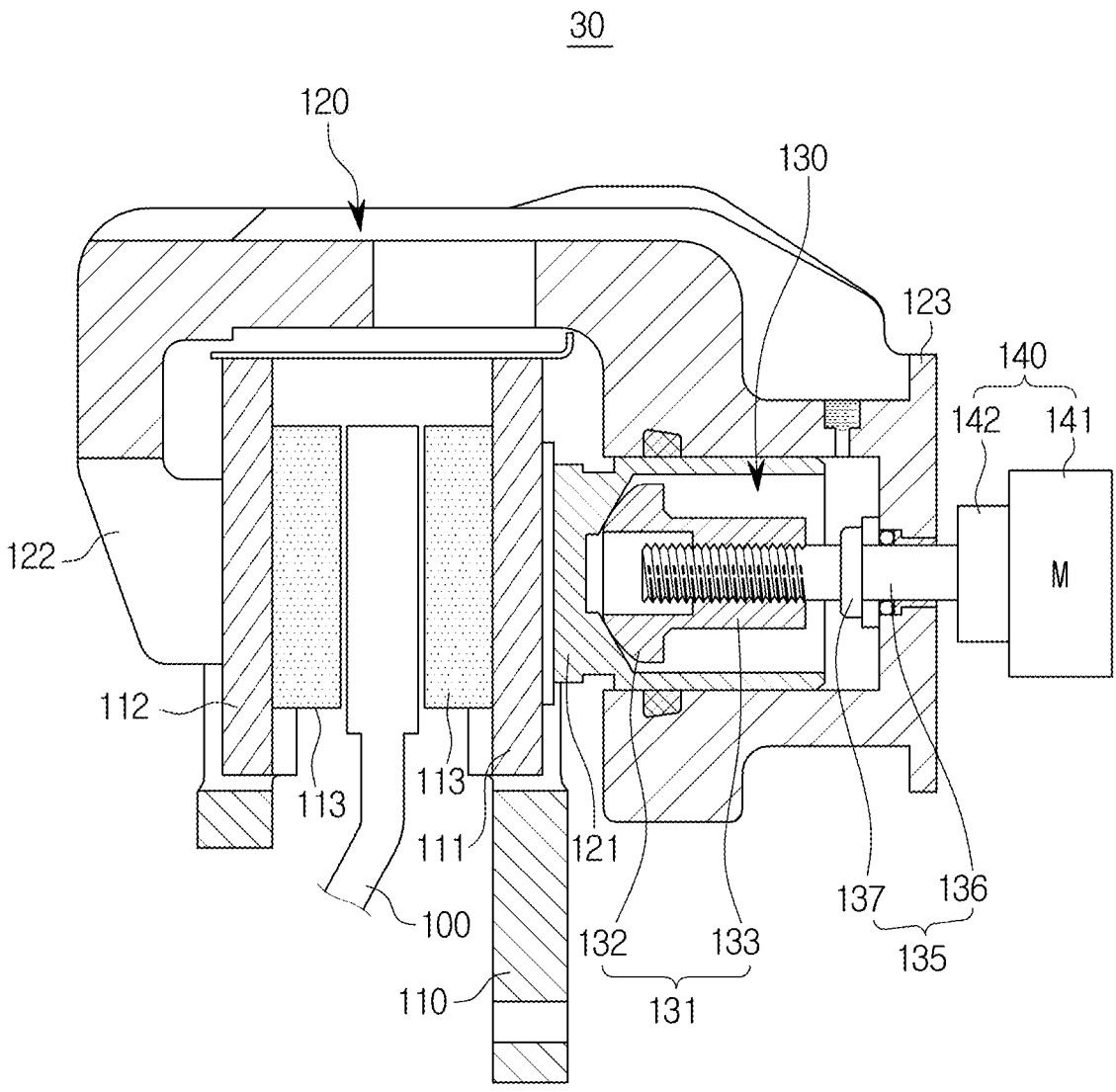
FIG. 2 is a diagram illustrating an electronic parking brake according to one exemplary embodiment.

FIG. 1 illustrates an electronic parking brake system 1 included in a vehicle according to an exemplary embodiment, and FIG. 2 illustrates an electronic parking brake according to an exemplary embodiment.

Referring to FIG. 1, the electronic parking brake system 1 may include an EPB switch 10, a current sensor 20, an electronic parking brake (EPB) 30, and a controller 40.

The EPB switch 10 is a switch for receiving a driver's manipulation of the electronic parking brake 30, and may be provided near a driver's seat of the vehicle.

The EPB switch 10 is provided to be turned on or off by a driver.

The EPB switch 10 transmits, to the controller 40, a signal corresponding to a parking apply command when turned on, and a signal corresponding to a parking release command when turned off.

The current sensor 20 may detect a current flowing in the motor.

For example, the current sensor 20 may detect a motor current flowing in the motor using a shunt resistor or a Hall sensor.

The current sensor 20 may be used in a variety of ways to detect the current flowing in the motor in addition to the shunt resistor or Hall sensor. The current sensor 20 may transmit the detected current value to the controller 40.

The electronic parking brake 30 may provide a parking braking force to the brake disc 100 that rotates together with the left and right rear wheels.

The electronic parking brake 30 generates a clamping force for parking for each rear wheel. The electronic parking brake 30 is controlled by the controller 40.

The electronic parking brake 30 is applied by the motor to generate the clamping force.

The electronic parking brake 30 drives the motor to press the brake pads 113 in brake calipers on the left and right rear wheels to the brake disc 100 to generate the clamping force.

Referring to FIG. 2, the electronic parking brake 30 may include a carrier 110 on which a pair of pad plates 111 and 112 are installed to move forward and backward so as to press the brake disc 100 that rotates with the wheel of the vehicle, a caliper housing 120 that is slidably installed on the carrier 110 and provided with a cylinder 123 on which piston 121 may move forward and backward by braking hydraulic pressure, a power conversion unit 130 that presses the piston 121, and an EPB actuator 140 that transmits a rotational force to the power conversion unit 130 using the motor.

The pair of pad plates 111 and 112 is divided into an inner pad plate 111 disposed in contact with the piston 121 and an outer pad plate 112 disposed in contact with a finger part 122 of the caliper housing 120.

This pair of pad plates 111 and 112 is installed on the carrier 110 fixed to the vehicle body so that it may move forward and backward toward both side surfaces of the brake disc 100.

In addition, the brake pads 113 are attached to one surface of each pad plate 111 and 112 facing the brake disc 100.

The caliper housing 120 is slidably installed on the carrier 110.

More specifically, the caliper housing 120 includes the cylinder 123 that has the power conversion unit 130 installed at the rear and is built so that the piston 121 can move forward and backward, and the finger part 122 that is molded to be bent downward to operate the outer pad plate 112 at the front portion. The finger part 122 and the cylinder 123 are formed integrally.

The piston 121 is provided in a cylindrical shape with a cup-shaped interior and is inserted so as to be slidable within the cylinder 123.

The piston 121 presses the inner pad plate 111 toward the brake disc 100 by an axial force of the power conversion unit 130 that receives the rotational force of the EPB actuator 140.

Accordingly, when the axial force of the power conversion unit 130 is applied, the piston 121 may move forward toward the inner pad plate 111 to press the inner pad plate 111, and cause the caliper housing 120 to operate in the opposite direction to the piston 121 due to the reaction force so that the finger part 122 presses the outer pad plate 112 toward the brake disc 100, thereby performing the braking.

The power conversion unit 130 may receive the rotational force from the EPB actuator 140 to press the piston 121 toward the inner pad plate 111.

The power conversion unit 130 is installed to be disposed within the piston 121 and may include a nut member 131 in contact with the piston 121, and a spindle member 135 screwed to the nut member 131.

The nut member 131 may be disposed within the piston 121 while the rotation is restricted and screwed to the spindle member 135.

The nut member 131 may include a head part 132 provided to contact the piston 121, and a coupling part 133 that extends from the head portion 132 and has a female thread formed on an inner peripheral surface to be screwed to the spindle member 135.

The nut member 131 moves in the forward or backward direction depending on the rotation direction of the spindle member 135 and may serve to press and press-release the piston 121.

In this case, the forward direction may be a moving direction in which the nut member 131 approaches the piston 121. The backward direction may be a moving direction in which the nut member 131 moves away from the piston 121.

In addition, the forward direction may be a moving direction in which the piston 121 approaches the brake pad 113. The backward direction may be a moving direction in which the piston 121 moves away from the brake pad 113.

The spindle member 135 may include a shaft part 136 that penetrates through the rear portion of the caliper housing 120 and rotates by receiving the rotational force of the EPB actuator 140, and a flange part 137 that extends radially from the shaft part 136.

One side of the shaft part 136 may be rotatably installed to penetrate through the rear side of the cylinder 123, and the other side may be disposed within the piston 121. In this case, one side of the shaft part 136 that penetrates through the cylinder 123 is connected to an output shaft of a reducer 142 and receives the rotational force of the EPB actuator 140.

The EPB actuator 140 may include the motor 141 and a reducer 142.

The motor 141 may move the nut member 131 forward and backward by rotating the spindle member 135, thereby pressing or press-releasing the piston 121.

The reducer 142 may be provided between the output side of the motor 141 and the spindle member 135.

In this way, the electronic parking brake 30 may move the nut member 131 by rotating the spindle member 135 in one direction using the EPB actuator 140 during the parking apply operation, thereby pressing the piston 121.

The piston 121 pressed by the movement of the nut member 131 may press the inner pad plate 111 to bring the brake pad 113 into close contact with the brake disc 100, thereby performing a clamping operation that generates the clamping force.

In addition, the electronic parking brake 30 may rotate the spindle member 135 in the opposite direction using the EPB actuator 140 during the parking release operation, thereby allowing the nut member 131 pressed against the piston 121 to move backward.

The pressure against the piston 121 may be released by the backward movement of the nut member 131. When the pressure against the piston 121 is released, the brake pad 113 is spaced apart from the brake disc 100, thereby performing the unclamping operation of releasing the clamping force generated.

The controller 40 may perform an operation of clamping and unclamping the electronic parking brake 30 using the operation signal input from the EPB switch 10 and the current value detected by the current sensor 20.

To this end, the controller 40 may include a processor 41 and a memory 42.

The processor 41 may control the overall operation of the electronic parking brake system 1.

More specifically, the processor 41 may control the parking apply operation and parking release operation of the electronic parking brake 30.

The processor 41 may calculate an inrush current model based on the inrush current stored in the memory 42.

In this regard, the processor 41 may store the inrush current in the memory 42 while the parking apply operation and parking release operation of the electronic parking brake 30 are each repeated a preset number of times.

The processor 41 may calculate the average value of the inrush current stored in the memory 42 and model the inrush current as an Nth order function (N is a natural number) based on the calculated average value.

In this case, the processor 41 identifies based on the calculated Nth order function whether the waveform of the expected current when the inrush current is removed increases approximately linearly in the no-load condition. Here, the expected current refers to the current value estimated to be the actual driving current of the motor when the inrush current is removed.

In this case, when the waveform of the expected current is identified as increasing linearly, the corresponding Nth order function may be determined as the inrush current model.

Thereafter, the processor 41 may store the calculated Nth order function and coefficients of the Nth order function in the memory 42.

According to one exemplary embodiment, the processor 41 may store the inrush current detected by the current sensor 20 as a first inrush current in the memory 42 while the parking apply operation of the electronic parking brake 30 is repeated a preset number of times.

In the same way, the processor 41 may store the inrush current detected by the current sensor 20 as a second inrush current in the memory 42 while the parking release operation of the electronic parking brake 30 is repeated a preset number of times.

The processor 41 may calculate the average value of the first inrush current and calculate the first inrush current model based on the calculated average value.

In addition, the processor 41 may calculate the average value of the second inrush current and calculate the second inrush current model based on the calculated average value. Specific details of the inrush current model will be described later with reference to FIGS. 3 and 4.

The processor 41 estimates the inrush current detected by the current sensor 20 during the actual parking apply operation of the parking brake based on the inrush current model calculated in this way.

The processor 41 may identify the actual clamping force of the EPB actuator 140 by removing the estimated inrush current.

According to one exemplary embodiment, the processor 41 may estimate the clamping force of the electronic parking brake 30 based on the inrush current model even during dynamic braking of the EPB.

That is, the processor 41 may estimate the clamping force more precisely by removing the inrush current in a re-clamp situation during the dynamic braking of the EPB.

According to one exemplary embodiment, the processor 41 may estimate and remove the inrush current by applying the first inrush current model during the parking apply operation of the electronic parking brake 30.

In addition, the processor 41 may estimate and remove the inrush current by applying the second inrush current model during the parking release operation of the electronic parking brake 30 in the same way.

The memory 42 may store programs for processing or controlling the processor 41 and various data for applying the electronic parking brake system 1.

For example, the memory 42 may store the inrush current that occurs when the electronic parking brake 30 is applied in the no-load condition.

In addition, the memory 42 may store the Nth order function calculated based on the inrush current and the coefficients of the Nth order function. Here, N may be set in various ways depending on the system requirements or circumstances.

The memory 42 may include not only volatile memories such as S-RAM and D-RAM, but also non-volatile memory such as flash memory, read only memory (ROM), and erasable programmable read only memory (EPROM).

Figure 3:
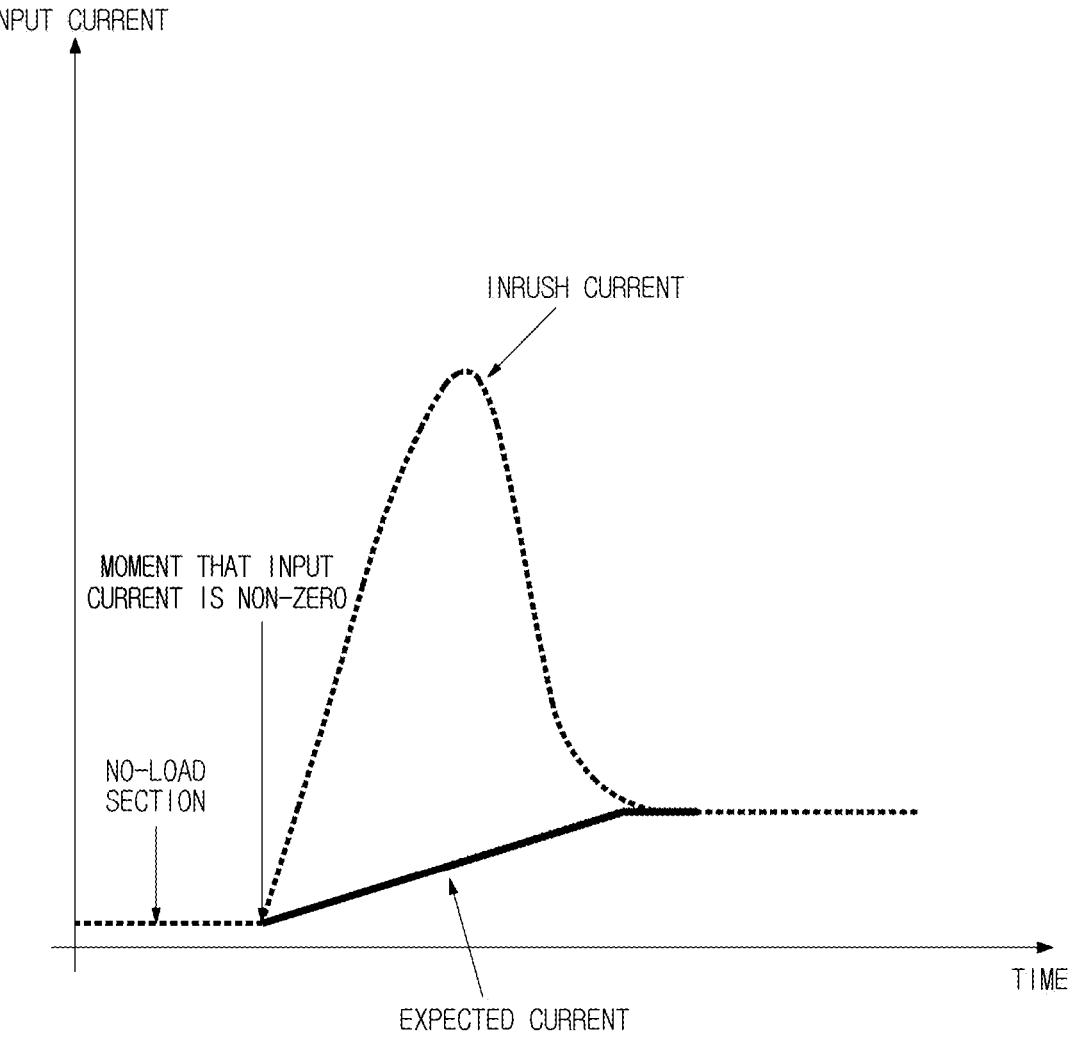
FIG. 3 is a graph showing an inrush current generated during a parking apply operation over time.
Figure 4:
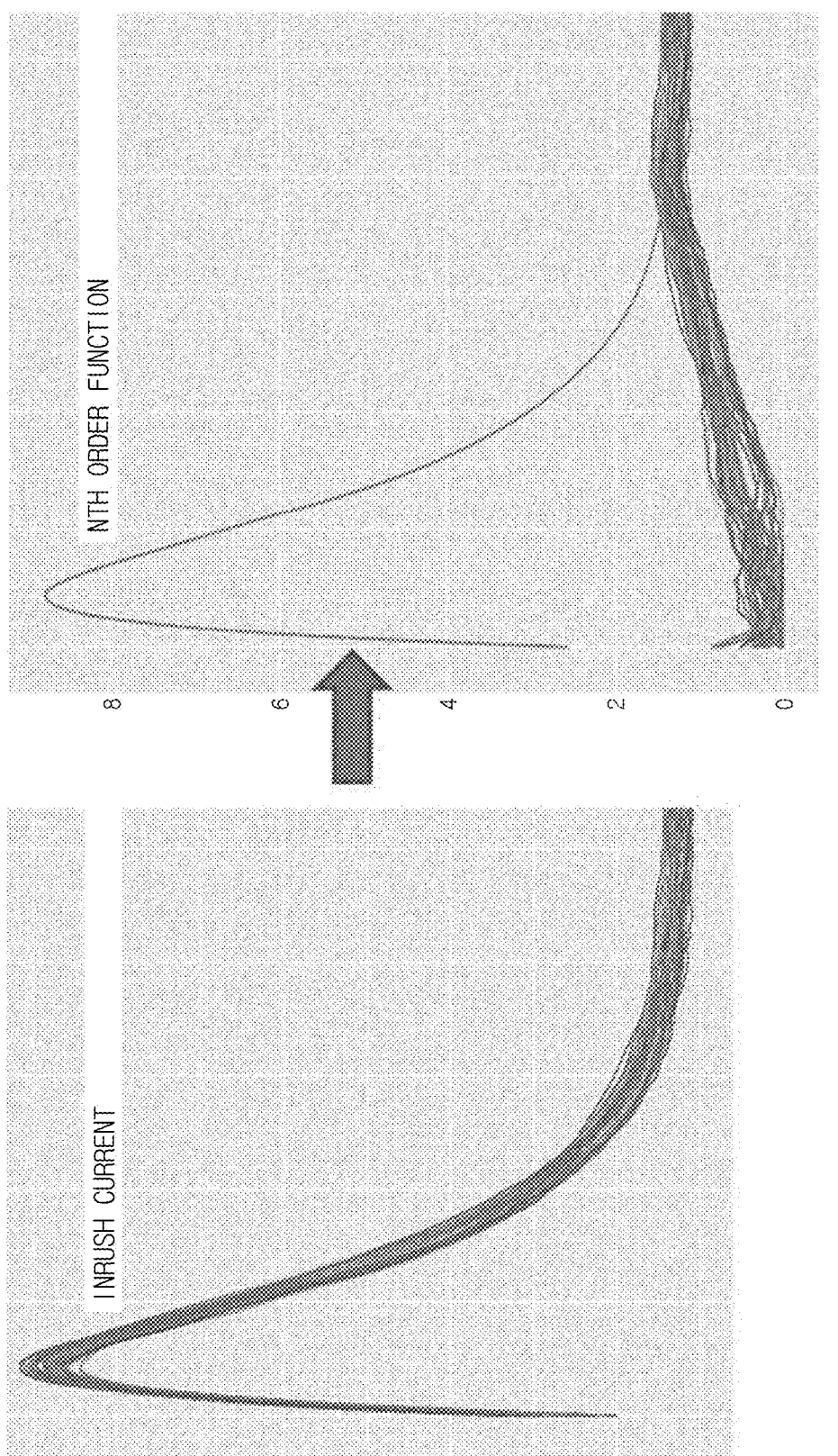
FIG. 4 is a graph repeatedly measuring the inrush current a preset number of times and a graph modeling the inrush current and converting the modeled inrush current into an Nth order function.

FIG. 3 is a graph showing an inrush current generated during a parking apply operation over time, and FIG. 4 is a graph repeatedly measuring the inrush current a preset number of times and a graph modeling the inrush current and converting the modeled inrush current into an Nth order function.

As described above, the inrush current model may be expressed as the Nth order function.

For example, as illustrated in FIG. 4, as a result of repeatedly measuring the actual inrush current of the vehicle, the waveform of the inrush current has a form similar to a quadratic function.

In this case, the Nth order function may be expressed as $y=ax^2+bx+c$.

In this case, the section from the time when the input current rapidly increases in the no-load condition (i.e., the input current is 0) to the time when the input current reaches its maximum value, falls, and begins to stabilize is the application section of the inrush current model.

The processor 41 may calculate a quadratic function based on a start time, an end time, a peak time, and a current value of an input current at each time in the application section.

In this case, the input current value at the start time may be 0 or a value close to 0.

In this case, the processor 41 stores each time and the current value at each time in the application section in the memory 42 while the parking apply operation and parking release operation of the electronic parking brake 30 are each repeated a preset number of times.

The processor 41 calculates a quadratic function based on each time and the average value of the current values at each time.

The processor 41 identifies based on the calculated quadratic function whether the waveform of the expected current when the inrush current is removed increases approximately linearly in the no-load condition. Here, the expected current refers to the current value estimated to be the actual driving current of the motor when the inrush current is removed.

In this case, when the waveform of the expected current is identified as increasing linearly, the corresponding quadratic function may be determined as the inrush current model.

Thereafter, the processor 41 may store the calculated quadratic function and the coefficients of the quadratic function in the memory 42.

Here, the inrush current model is explained as calculating one Nth order function, but is not limited thereto.

For example, the inrush current model may include the first inrush current model and the second inrush current model.

The first inrush current model may be applied during the parking apply operation of the electronic parking brake 30, and the second inrush current model may be applied during the parking release operation of the electronic parking brake 30.

Figure 5:
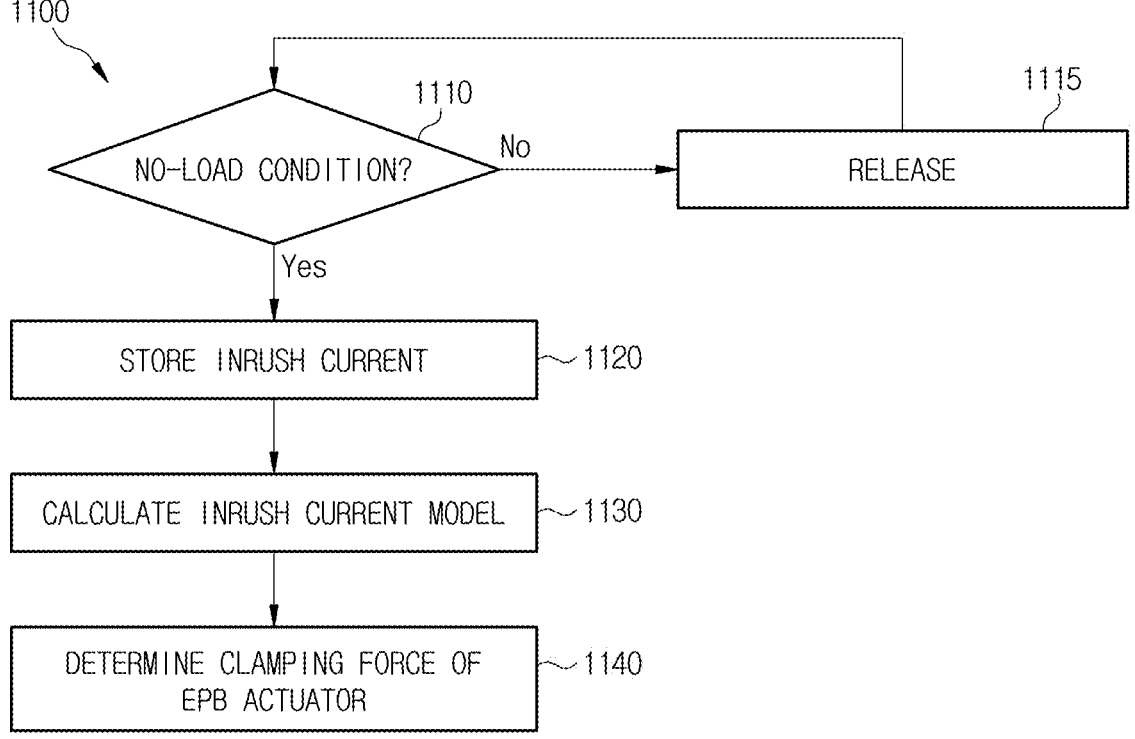
FIG. 5 is a diagram illustrating a control method of an electronic parking brake system according to one exemplary embodiment.

FIG. 5 illustrates a control method 1100 of the electronic parking brake system 1 according to an exemplary embodiment.

Referring to FIG. 5, the control method 1100 of the electronic parking brake system 1 may include identifying the no-load condition (1110), when there is no no-load condition, releasing the electronic parking brake (1115), when there is the no-load condition, storing the inrush current generated by applying the electronic parking brake 30 a preset number of times (1120), calculating the inrush current model based on the inrush current (1130), and estimating the driving current of the motor by removing the inrush current generated when applying or releasing the parking of the electronic parking brake 30 from the Nth order function and identifying the clamping force of the EPB actuator 140 based on the estimated driving current (1140).

The storing of the inrush current (1120) may include storing the inrush current while the parking apply operation and parking release operation of the electronic parking brake 30 are each repeated a preset number of times.

The calculating of the inrush current model (1130) may include calculating the inrush current model based on an average value of the inrush current.

Here, the inrush current model is the Nth order function. The calculating of the inrush current model may include storing the calculated Nth order function and the coefficients of the Nth order function.

According to one exemplary embodiment, the storing of the inrush current (1120) may include storing the inrush current as a first inrush current while the parking apply operation of the electronic parking brake 30 is repeated a preset number of times.

In addition, the storing of the inrush current (1120) may include storing the inrush current as the second inrush current while the parking release operation of the electronic parking brake 30 is repeated a preset number of times.

Here, the inrush current model may include the first inrush current model and the second inrush current model.

The calculating of the inrush current model (1130) may include calculating the first inrush current model based on the average value of the first inrush current, and calculating the second inrush current model based on the average value of the second inrush current.

In this case, the first inrush current model and the second inrush current model may be the Nth order function.

The calculating of the inrush current model (1130) may include storing each Nth order function and the coefficients of the Nth order function.

Figure 6:
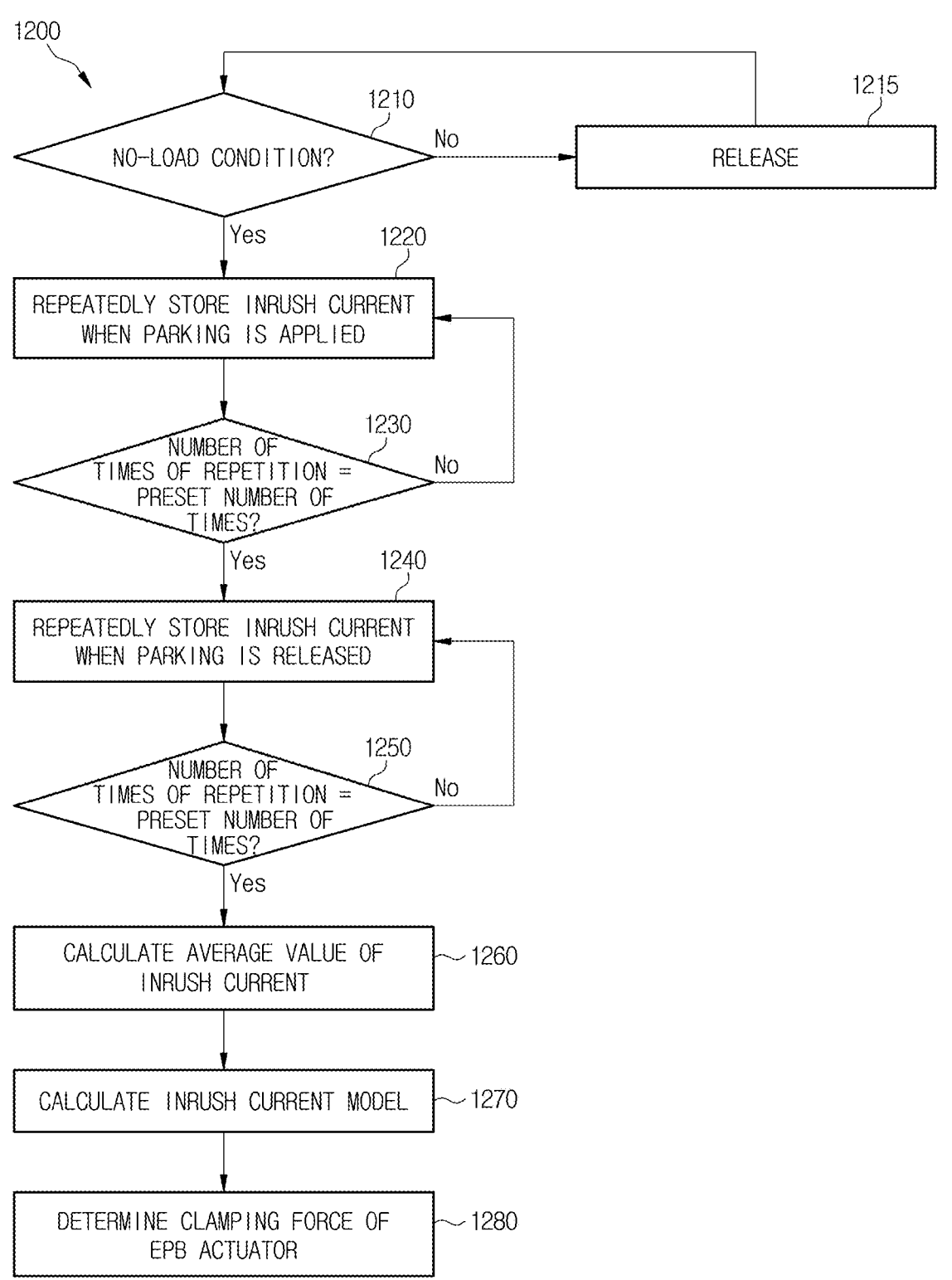
FIG. 6 is a diagram illustrating in more detail the control method of an electronic parking brake system illustrated in FIG. 5.

FIG. 6 is a diagram illustrating in more detail the control method of the electronic parking brake system 1 illustrated in FIG. 5.

Referring to FIG. 6, a control method (1200) of the electronic parking braking system 1 may include identifying a no-load condition (1210), when there is no no-load condition, releasing the electronic parking brake (1215), when there is the no-load condition, storing the inrush current generated during the parking apply operation of the electronic parking brake 30 a preset number of times (1220), identifying whether the number of times of repetitions is a preset number (1230), storing the inrush current generated when the parking of the electronic parking brake 30 is released a preset number of times (1240), identifying whether the number of times of repetitions is a preset number of times (1250), calculating the average value of the stored inrush current (1260), calculating the inrush current model based on the average value of the inrush current (1270), and identifying the clamping force of the EPB actuator 140 when the electronic parking brake 30 is applied in the no-load condition based on the inrush current model and the inrush current (1280).

The identifying of the clamping force of the EPB actuator 140 (1280) may include estimating the driving current of the motor by removing the inrush current generated during the parking apply operation or parking release operation of the electronic parking brake 30 from the Nth order function, and identifying the clamping force of the EPB actuator 140 based on the estimated driving current.

As described above in the description of FIG. 5, the inrush current model may be one inrush current model, but is not limited thereto and may include the first inrush current model and the second inrush current model.

That is, the first inrush current model may be applied during the parking apply operation of the electronic parking brake 30, and the second inrush current model may be applied during the parking release operation of the electronic parking brake 30.

This may be applied when the inrush current during the parking apply operation and the inrush current during the parking release operation are different due to various variables and factors within the electronic parking brake 30.

According to one aspect of the present disclosure, there may be provided the electronic parking brake system capable of accurately estimating and removing the inrush current generated during the parking apply operation, and the control method thereof.

As a result, according to the electronic parking brake system and the control method thereof, it is possible to prevent misdiagnosing the actuator failures due to the inrush current.

In addition, it is possible to estimate the braking force of the MoC even during the dynamic braking of the EPB.

In addition, it is possible to precisely estimate the clamping force by excluding the re-clamp inrush current.

The spirit of the present disclosure has been just exemplified. It will be appreciated by those skilled in the art that various modifications and alterations can be made without departing from the essential characteristics of the present disclosure. Accordingly, exemplary embodiments disclosed in the present disclosure are not to limit the spirit of the present disclosure, but are to describe the spirit of the present disclosure. The scope of the present disclosure is not limited to these exemplary embodiments. The scope of the present disclosure should be interpreted by the following claims, and it should be interpreted that all the spirits equivalent to the following claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic parking brake system, comprising:
an electronic parking brake that includes an electronic parking brake actuator applied by a motor;
a current sensor configured to detect a current flowing in the motor;
a processor configured to control a parking apply operation of the electronic parking brake; and
a memory configured to store an inrush current generated during the parking apply operation of the electronic parking brake in a no-load condition,
wherein the processor is configured to:
in the no-load condition, store the inrush current generated during the parking apply operation of the electronic parking brake a preset number of times;
store the inrush current generated when the parking of the electronic parking brake is released the preset number of times;
calculate an average value of the stored inrush current;
calculate an inrush current model based on the average value of the inrush current; and
identify a clamping force of the electronic parking brake actuator based on the inrush current model and the inrush current.

2. The electronic parking brake system according to claim 1, wherein the inrush current model is an Nth order function,
wherein the processor is configured to store coefficients of the Nth order function in the memory, and
wherein N is a natural number.

3. The electronic parking brake system according to claim 2, wherein the processor is configured to estimate a driving current of the motor by removing from the Nth order function the inrush current generated during the parking apply operation or parking release operation of the electronic parking brake.

4. The electronic parking brake system according to claim 3, wherein the processor is configured to identify a clamping force of the electronic parking brake actuator based on the estimated driving current.

5. The electronic parking brake system according to claim 1, wherein the inrush current model includes a first inrush current model and a second inrush current model, and
the processor is configured to calculate the first inrush current model based on an average value of the first inrush current, and calculate the second inrush current model based on an average value of the second inrush current.

6. The electronic parking brake system according to claim 5, wherein the first inrush current model and the second inrush current model are an Nth order function,
wherein the processor is configured to store each coefficient of each Nth order function in the memory, and
wherein N is a natural number.

7. A control method of an electronic parking brake system including an electronic parking brake actuator applied by a motor, the control method comprising:
identifying a no-load condition;
in the no-load condition, storing an inrush current generated during a parking apply operation of an electronic parking brake a preset number of times;
storing the inrush current generated when the parking of the electronic parking brake is released the preset number of times;
calculating an average value of the stored inrush current;
calculating an inrush current model based on the average value of the inrush current; and
identifying a clamping force of the electronic parking brake actuator based on the inrush current model and the inrush current.

8. The control method according to claim 7, wherein the inrush current model is an Nth order function,
wherein the calculating of the inrush current model includes storing coefficients of the Nth order function, and
wherein N is a natural number.

9. The control method according to claim 8, further comprising:
estimating a driving current of the motor by removing from the Nth order function the inrush current generated during the parking apply operation or parking release operation of the electronic parking brake, and
identifying a clamping force of the electronic parking brake actuator based on the estimated driving current.

10. The control method according to claim 7, wherein:
the inrush current model includes a first inrush current model and a second inrush current model, and
the calculating of the inrush current model includes:
calculating the first inrush current model based on an average value of the first inrush current, and
calculating the second inrush current model based on an average value of the second inrush current.

11. The control method according to claim 10, wherein the first inrush current model and the second inrush current model are an Nth order function,
wherein the calculating of the inrush current model includes storing each coefficient of the Nth order function, and
wherein N is a natural number.

12. A control method of an electronic parking brake system including an electronic parking brake actuator applied by a motor, the control method comprising:
identifying a no-load condition;
in the no-load condition, storing an inrush current generated during a parking apply operation of an electronic parking brake a preset number of times;

storing the inrush current generated when the parking of the electronic parking brake is released the preset number of times;

calculating an average value of the stored inrush current;

calculating an inrush current model based on the average value of the inrush current; and identifying a clamping force of the electronic parking brake actuator during the parking apply operation of the electronic parking brake in the no-load condition based on the inrush current model and the inrush current.

* * * * *